(12) United States Patent
Srinivasan et al.

(10) Patent No.: US 7,743,369 B1
(45) Date of Patent: Jun. 22, 2010

(54) ENHANCED FUNCTION POINT ANALYSIS

(75) Inventors: Lavanya Srinivasan, Overland Park, KS (US); Steven S. Stefan, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1362 days.

(21) Appl. No.: 11/193,608

(22) Filed: Jul. 29, 2005

(51) Int. Cl.
*G06F 9/44* (2006.01)

(52) U.S. Cl. .................................................. 717/155
(58) Field of Classification Search ................. 717/154, 717/155
See application file for complete search history.

(56) References Cited

U.S. PATENT DOCUMENTS

| | | | |
|---|---|---|---|
| 5,446,895 A | 8/1995 | White et al. | |
| 6,073,107 A | 6/2000 | Minkiewicz et al. | |
| 6,226,792 B1 | 5/2001 | Goiffon et al. | |
| 6,519,763 B1 | 2/2003 | Kaufer et al. | |
| 6,550,053 B1 | 4/2003 | Muckley | |
| 6,810,392 B1 * | 10/2004 | Piggott | 706/12 |
| 6,938,007 B1 | 8/2005 | Iulianello et al. | |
| 7,003,766 B1 | 2/2006 | Hong | |
| 7,159,209 B1 | 1/2007 | Srinivasan et al. | |
| 7,213,234 B1 | 5/2007 | Below | |
| 7,249,051 B1 | 7/2007 | Jenniges et al. | |
| 2002/0038235 A1 | 3/2002 | Musafia et al. | |
| 2003/0033586 A1 * | 2/2003 | Lawler | 717/101 |
| 2003/0070157 A1 | 4/2003 | Adams et al. | |
| 2003/0101091 A1 | 5/2003 | Levin et al. | |
| 2003/0192029 A1 | 10/2003 | Hughes | |
| 2004/0225397 A1 | 11/2004 | Gotfried | |
| 2007/0203856 A1 * | 8/2007 | Frohnhoefer et al. | 705/400 |

OTHER PUBLICATIONS

Abran, A.; Robillard, P.N.; "Function points analysis: an empirical study of its measurement processes", Software Engineering, IEEE Transactions on vol. 22, Issue 12, Dec. 1996 pp. 895-910 Digital Object Identifier 10.1109/32.553638.*

Costagliola, G.; Ferrucci, F.; Tortora, G.; Vitiello, G.; "Class point: an approach for the size estimation of object-oriented systems", Software Engineering, IEEE Transactions on vol. 31, Issue 1, Jan. 2005 pp. 52-74 Digital Object Identifier 10.1109/TSE.2005.5.*

Fornaciari, W.; Micheli, P.; Salice, F.; Zampella, L.; "A first step towards Hw/Sw partitioning of UML specifications", Design, Automation and Test in Europe Conference and Exhibition, 2003 pp. 668-673 Digital Object Identifier 0.1109/Date.2003.1253684.*

(Continued)

*Primary Examiner*—Wei Y Zhen
*Assistant Examiner*—Philip Wang

(57) ABSTRACT

A system for automatically counting function points is provided. The system includes an electronic document, an analysis component, and a user interface. The electronic document contains a sequence diagram that specifies interactions in a software application. The analysis component can analyze the interactions in the sequence diagram to identify a start point and an end point in the sequence diagram as a function point. The analysis component can also maintain a count of the function points. The user interface can promote counting one or more function points when more than one of the sequence diagrams involve data that is part of a set of data objects identified via the user interface.

20 Claims, 4 Drawing Sheets

OTHER PUBLICATIONS

Uemura, T.; Kusumoto, S.; Inoue, K.; "Function point measurement tool for UML design specification", Software Metrics Symposium, 1999. Proceedings. Sixth International Nov. 4-6, 1999 pp. 62-69 Digital Object Identifier 10.1109/Metric.1999.809727.*

Piero Fraternali, Massimo Tisi, Aldo Bongio, "Automating function point analysis with model driven development", Oct. 2006, CASCON '06: Proceedings of the 2006 conference of the Center for Advanced Studies on Collaborative research Publisher: ACM.*

Uemura, T.; Kusumoto, S.; Inoue, K.; "Function-point Analysis using Design Specification on the Unified Modeling Language", Journal of Software Maintenance and Evolution: Research and Practice vol. 13 Issue 4, pp. 223-243 (Published Aug. 2001).*

Meli, Roberto, "Early and Extended Function Point: A New Method for Function Points Estimation," 1997, IFPUG Fall Conference pp. 1-11.

Maxwell, et al., "Collecting Data for Comparability: Benchmarking Software Development Productivity", Sep./Oct. 2001, IEEE Software, pp. 22-25.

Office Action dated Dec. 24, 2008, 30 pages, U.S. Appl. No. 10/867,074, filed Jun. 14, 2004.

Advisory Action dated Nov. 26, 2008, 3 pages, U.S. Appl. No. 10/960,878, filed Oct. 7, 2004.

Office Action dated Mar. 18, 2009, 20 pages, U.S. Appl. No. 10/960,878, filed Oct. 7, 2004.

Nesi, et al., "Metric Framework for Object Oriented Reeal-Time Systems Specificaton Languages", 1996, J. Systems Software, vol. 34.

Smith, John, "The Estimation of Effort Based on Use Cases", 1999, Rational Software White Paper.

Maxwell, et al., "Benchmarking Software Development Productivity", 2000, IEEE Software.

"Function-point Analysis Using Design Specifications Based on the Unified Modelling Language", Journal of Software Maintenance and Evolution: Research and Practice, vol. 13, Issue 4, pp. 22-243 (Aug. 2001).

Antoniol, et al., "A Function Point-Like Measure for Object-Oriented Software", Empirical Software Engineering, vol. 4, No. 3, pp. 263-287, 2001.

Office Action dated Oct. 11, 2007, 24 pages, U.S. Appl. No. 10/867,074, filed Jun. 14, 2004.

Office Action dated Jan. 22, 2008, 13 pages, U.S. Appl. No. 10/960,878, filed Oct. 7, 2004.

Office Action dated April 16, 2008, 24 pages, U.S. Appl. No. 10/867,074, filed Jun. 14, 2004.

Fioravanti, et al., "Estimation and Prediction Metrics for Adaptive Maintenance Effort of Object-Oriented Systems," IEEE Transactions on Software Engineering, vol. 27, No. 12, 2001.

Final Office Action dated Jul. 9, 2008, 20 pages, U.S. Appl. No. 10/960,878, filed Oct. 7, 2004.

Final Office Action dated Jul. 11, 2008, 24 pages, U.S. Appl. No. 10/867,074, filed Jun. 14, 2004.

Advisory Action dated Sep. 25, 2008, 4 pages, U.S. Appl. No. 10/867,074, filed Jun. 14, 2004.

Software Composition Technologies, Inc., Function Point FAQ, Jun. 25, 1997, 30 pgs.

Carnegie Mellon University, The Software Engineering Institute (SEI), Function Point Analysis, Software Technology Roadmap, Jan. 9, 2004, 4 pgs.

Akram, Abdul G., et al., Productivity Measurement and Management Tool, filed Jun. 14, 2004, U.S. Appl. No. 10/867,074, Specification (29 pgs.), Drawings (4 sheets).

Srinivasan, Lavanya, et al., "Function Point Analysis System and Method," filed Oct. 7, 2004, U.S. Appl. No. 10/960,878, Specification (29 pgs.), Drawings (4 sheets).

Ahmed et al. "Developing Enterprise Java Applications with J2EE and UML", Oct. 2001, Addison-Wesley Professional, Excerpts: section "Identifying the Actors", "Sequence Diagrams".

Bitner et al. "Use Case Modeling", Aug. 20, 2002, Addison-Wesley Professional, Chapter 4.

Final Office Action dated Jul. 8, 2009, 34 pages, U.S. Appl. No. 10/867,074, filed Jun. 14, 2004.

Recitation dated Jan. 24, 2003, Retrieved from http://www.econ.umn.edu/'mbar/Macro1102_files/RecitationJan24.pdf on Oct. 19, 2009, 2 pages.

Notice of Allowance dated Oct. 5, 2009, 6 pages, U.S. Appl. No. 10/867,074, filed Jun. 14, 2004.

Office Action dated Oct. 22, 2009, 26 pages, U.S. Appl. No. 10/960,878, filed Oct. 7, 2004.

* cited by examiner

ENHANCED FUNCTION POINT ANALYSIS

CROSS-REFERENCE TO RELATED APPLICATIONS

This application includes subject matter similar to U.S. patent application Ser. No. 10/867,074 filed Jun. 14, 2004 and entitled "Productivity Measurement and Management Tool", and to U.S. patent application Ser. No. 10/960,878 filed Oct. 7, 2004 and entitled "Function Point Analysis System and Method", both of which are incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to the management of computer software development projects, and more particularly, but not by way of limitation, to a productivity measurement and management tool and method.

BACKGROUND OF THE INVENTION

It is desirable to complete software development projects on time and within the budget allocated to complete the projects. Accurately estimating the level of effort (LOE), or man-hours, needed to complete a project contributes towards realistic project scheduling and project budgeting. Without an accurate LOE estimate for the project, for example, too many or too few developers may be applied to the project and the project may be delivered late and/or over budget. By comparing an estimated LOE generated before a project commences with an actual LOE measured during or after a project, an enterprise can keep track of the budget and schedule of a project.

Various methods of estimating the LOE needed to complete a project have been employed with varying degrees of success. One of these, function point analysis, involves identifying and counting functionalities or function points to be delivered by a project. The function points can be assigned complexity ratings that reflect the amount of effort needed to achieve the specified functionality. Typically, the more function points to be delivered and the greater the complexity of the function points, the greater the LOE needed to complete the project.

SUMMARY OF THE INVENTION

According to one embodiment, a system for automatically counting function points is provided. The system includes an electronic document, an analysis component, and a user interface. The electronic document contains a sequence diagram that specifies interactions in a software application. The analysis component can analyze the interactions in the sequence diagram to identify a start point and an end point in the sequence diagram as a function point. The analysis component can also maintain a count of the function points. The user interface can promote counting one or more function points when more than one of the sequence diagrams involve data that is part of a set of data objects identified via the user interface.

According to another embodiment, a system for automatically estimating a level of effort to be expended to develop a software application based on an automatically generated function point count is provided. The system includes a first electronic document, a function point counter, a second electronic document, a user interface, a computing tool, and an estimator component. The first electronic document contains a sequence diagram that specifies interactions for the software application to be developed. The function point counter can map the interactions in the sequence diagram in the first electronic document to function points. The function point counter can also maintain a count of the function points. The second electronic document can maintain a list of previous functions points related to previously developed software application interactions. The user interface can promote counting as a single function point when more than one of the sequence diagrams manipulate data of the set of data objects identified by the user interface. The computing tool can compute a net function points for the software application to be developed by subtracting from the count of the function points from the first electronic document the previous function points having interactions similar to interactions of the function points from the first electronic document. The estimator component can use the count of net function points to create an estimate of the level of effort to be expended to develop the software application.

In another embodiment, a method for managing a software development project is provided. The method includes specifying a relationship among a set of data objects, assigning a function point count to a transaction involving at least one of the set of data objects, maintaining a count of function points, creating a net function points count by subtracting from the count of mapped function points the number of previously developed function points, and calculating a level of effort based on the count of net function points.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
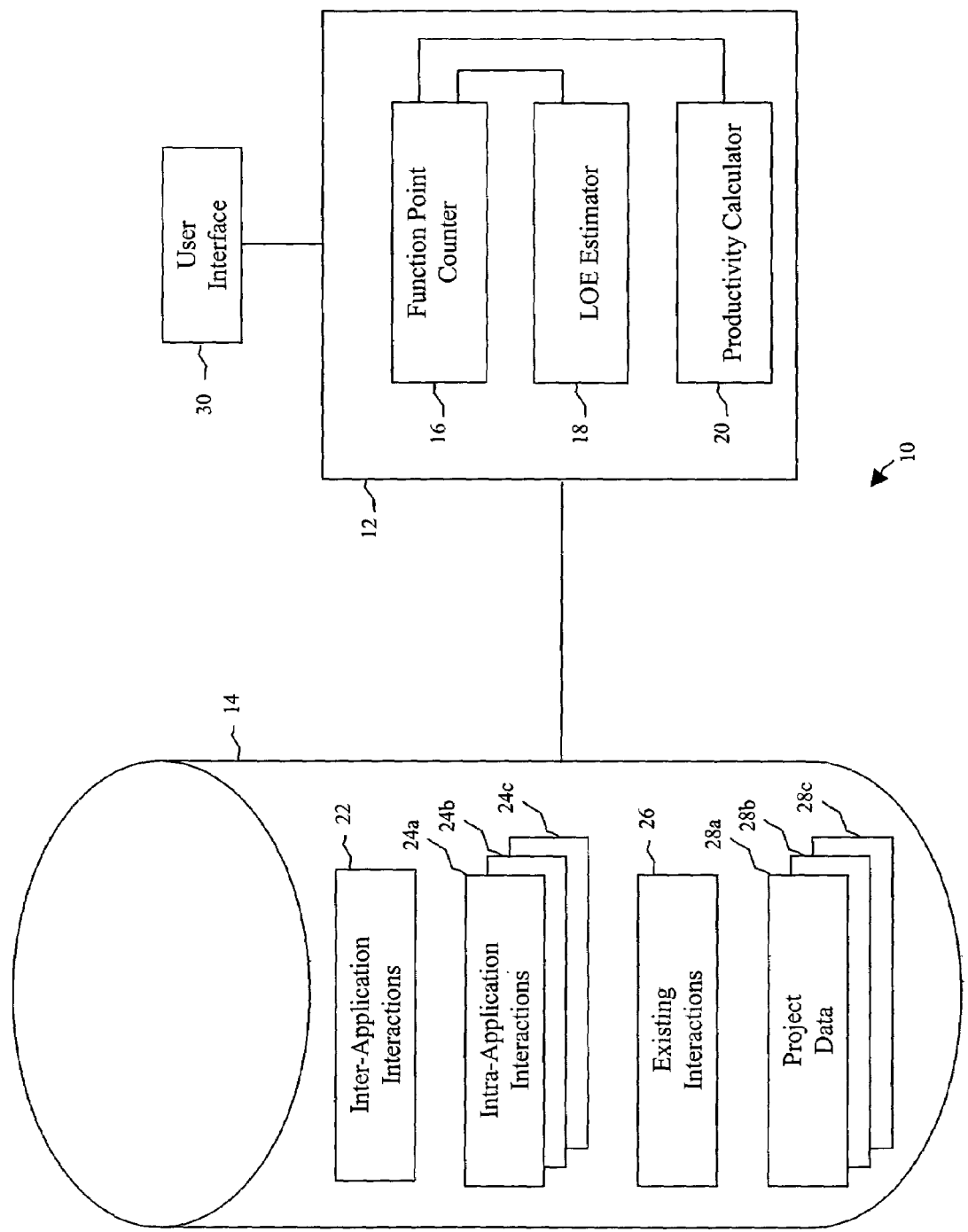
FIG. 1 is a block diagram of a function point counting system according to an embodiment.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The use of function point analysis to estimate the LOE required to complete a development project, for example a software development project, has been found to be challenging. For example, estimating LOE based on function points can be a labor intensive and time consuming activity in which personnel may have to analyze documents and perform the function point analysis manually. Additionally, the use of function points to estimate LOE can be highly subjective since the criteria for identifying function points may be ambiguous. As such, different analysts working on the same proposed project may arrive at different function point counts.

The present disclosure, according to one embodiment, is directed to a tool that can generate a level of effort estimate based on an automatic and objective evaluation of function points in a proposed software development project. The tool allows organizations to readily and accurately identify all the functionality required for a new application or project being developed in-house or by an outsourced supplier. The tool also identifies any of the functionality that has already been developed, such as in a previous project, to accurately assess development costs and avoid charges for developing functionality that may have already been developed. The tool also allows a human analyst to specify a function point count that will be assigned to a group of related data objects.

Definitions of function points and procedures for manually counting function points are given in numerous documents well known to those of skill in the art. According to standard nomenclature, function points can include transaction function types and data function types. Transaction function types can include External Inputs, External Outputs, and External Queries. Data function types can include Internal Logical Files and External Interface Files.

In an embodiment, one or more application model documents (AMDs) and/or interface control documents (ICDs) are created before a project begins. The AMDs and/or ICDs describe the functionality the project is to provide, such as inputs, outputs, queries, and inter-application and intra-application method calls. In an embodiment, the AMDs describe intra-application interactions and the ICDs describe inter-application interactions.

The project functionality can be depicted in a set of sequence diagrams, also known as message sequence diagrams. The sequence diagrams graphically depict communications between applications, between software components, between classes or objects, or other software entities. Sequence diagrams also graphically depict the temporal relationship or sequence of the communications. In an embodiment, the sequence diagrams, AMDs, and ICDs are created with the aid of a computer aided software engineering tool such as IBM's RationalRose.

In such an AMD or ICD, classes of packages can be defined such as actor, user interface, system component, application data store, and other standard components as specified by the vendor of the computer aided software engineering tool. These components act as start points or end points in a sequence diagram. For example, if a user interface is acting on an application data store, an AMD or ICD might record the user interface as a start point in a sequence diagram and the application data store as an end point in the sequence diagram. Similarly, if a system component is acting on an actor, an AMD or ICD might record the system component as a start point in a sequence diagram and the actor as an end point in the sequence diagram. A single pair of start and end points or multiple pairs of start and end points may then be associated with an appropriate function point. Function points determined in this manner can then be counted for LOE computation and other purposes.

Turning now to FIG. 1, a block diagram of a system 10 according to an embodiment of the present disclosure is depicted. A function point counting tool 12 is in communication with a database 14. The function point counting tool 12 includes a function point counter 16 that counts the number of function points associated with a model of a project. In an embodiment, the function point counter 16 counts function points by automatically reading an AMD or ICD, converting into a function point one or more pairs of start and end points in a sequence diagram described by the AMD or ICD, and keeping track of the function points thus generated.

For example, if an AMD or ICD indicates that a user interface is the start point in a sequence diagram and that an application data store is the end point in a sequence diagram, the function point counter 16 might count these start and end points as a single External Input. The function point counter 16 might also count as a single External Input the case where an actor is the start point and an application data store is the end point or the case where a user interface is the start point and a system component is the end point.

The function point counter 16 might count as a single External Output a case where a system component is the start point and either an actor, a user interface, or an application data store is the end point. Alternatively, the function point counter 16 might count as a single External Query a case where a system component is the start point and either an actor, a user interface, or an application data store is the end point. One of skill in the art will recognize that other conversions are possible between the sequence diagram start and end points described in an AMD or ICD and function points, including other types of function points such as Internal Logical Files and External Interface Files. The process of converting the start and end points in a sequence diagram into function points can continue until all the sequence diagrams in an AMD or ICD have been converted.

In some cases, counting every pair of start and end points in a sequence diagram as a function point can lead to a function point count that is too high. For example, it may be inappropriate to count five updates to a database as five Internal Logical Files if the five data items that are updated are related to one another. The five updates might be more appropriately counted as one Internal Logical File in such a case. In an embodiment, a process that involves multiple related data objects is counted as a single function point. For example, if multiple objects in a table are related to each other, a transaction involving one or more of the related objects would be counted as one function point.

The relationships among a highly complex group of data objects cannot always be determined through an automatic reading of an AMD or an ICD. In an embodiment, a human analyst specifies the relationships among a class of data objects. The analyst might be guided by a questionnaire that asks questions about the data relationships. For example, the analyst might be asked whether one object in a table is a parent or a child of another object. The analyst might use the completed questionnaire as a basis for specifying the relationships among the objects in a data class. Alternatively, an automated analysis of the completed questionnaire might be done to automatically specify the data relationships.

When the relationships among the data objects in the class have been established, a function point count can be assigned to a related group of objects in the class so that any transaction involving one or more of the objects will have the assigned function point count. Highly complex groups can be assigned higher function point counts and less complex groups can be assigned lower function point counts.

As an example, a group of data objects might contain a customer name, a customer address, a customer telephone number, and other customer information. If the name, address, and telephone number all need to be modified, an automated function point counting system might count the three modifications as three function points. However, it may be more appropriate to count the three modifications as a single modification to a group of related data objects and to count the single modification as a single function point.

Under the current embodiments, a human analyst can examine such a group of data, determine the relationships among the objects in the group, and assign function point counts to transactions involving the group based on the complexity of the relationships. In this relatively simple example, a function point count of one might be assigned to the modification of the data group, but for more complex groups and more complex transactions, a higher function point count might be assigned. However, the assigned function point count would still typically be lower than the count that might be derived by a totally automated system that does not allow human analysis of the relationships among a group of data.

Relationship information for the data objects in a class can be entered into the function point counting tool 12 through a user interface 30. That is, the questionnaire that is used to elicit data relationship information might appear on the user interface 30 and an analyst might enter the answers to the questions into the user interface 30. The user interface 30 can then communicate the answers to the function point counting tool 12, and more specifically to the function point counter 16. The function point counter 16 can then count an appropriate number of function points for transactions involving the class. The questions and answers regarding data relationships might be stored in the database 14 or in some other data storage medium accessible to the user interface 30 and the function point counting tool 12.

In an embodiment, the function point counter 16 assigns all function points medium-range complexity ratings as a default and the complexity ratings remain at the medium range. In an alternative embodiment, after the function point counter 16 has completed counting the function points and has assigned the function points the default complexity rating, a human analyst makes adjustments to the complexity ratings. That is, if the analyst determines that the medium-range rating is too low or too high, the analyst can raise or lower the rating as appropriate.

In an alternative embodiment, the function point counter 16 can use information about previous projects to assign complexity ratings to function points. That is, feedback regarding how well a previous complexity rating reflected the actual complexity of a function point in a completed project can be used to refine the complexity rating assignments of future projects. Again, a human analyst may make adjustments to the complexity ratings derived in this manner.

The function point counting tool 12 also includes an LOE estimator 18 that estimates the LOE associated with completing a project. The LOE produced by the LOE estimator 18 is preferably expressed as the estimated number of development hours needed to complete the project, but may be expressed in other manners as well. The function point counting tool 12 also includes a productivity calculator 20 that calculates a productivity metric for the project.

The function point counting tool 12 is a software application that may execute on a general-purpose computer system. General-purpose computer systems are discussed in detail hereinafter. In an embodiment, the function point counter 16, the LOE estimator 18, and the productivity calculator 20 may be separated or combined in various ways. For example, the function point counter 16 and LOE estimator 18 may be combined in a software component. Alternately, the function point counter 16, the LOE estimator 18, and the productivity calculator 20 may all be combined in a software component.

The database 14 includes an inter-application document 22 identifying interactions or communications between a plurality of applications involved in providing the functionality contemplated by the project. The applications may be existing applications that are being extended to provide new functionality. Alternately, the applications may be planned to be developed specifically for the project. The interactions between applications may be application programming interface (API) method calls.

The database 14 includes one or more intra-application documents 24—a first intra-application document 24a, a second intra-application document 24b, and a third intra-application document 24c—that identify interactions or communications within each of the applications involved in providing the functionality contemplated by the project. The database 14 includes an existing interactions document 26, which identifies existing interactions or communications between existing applications and interactions or communications within existing applications. In some cases, the existing interactions document 26 may not be provided, as when the system 10 is first deployed and there is no information on interactions available from previous projects or in a start-up software development organization.

Taken together, the inter-application document 22 and the intra-application documents 24 provide at least a part of an analysis model of the project. In some embodiments, other documents may provide other parts of the analysis model of the project. Additionally, the inter-application document 22 and the intra-application documents 24 may contain other information in addition to interactions. The existing interactions document 26 may provide at least a part of one or more analysis models associated with completed projects. In an embodiment, the interactions document 26 may be composed of a plurality of analysis model documents associated with completed projects.

The database 14 also includes a plurality of project data 28—a first project data 28a, a second project data 28b, and a third project data 28c—associated with projects. Data may be stored for completed projects, projects in a development stage, and projects in a planning stage. The project data 28 may include the function point count associated with a completed project and the actual LOE expended on the completed project. The project data 28 may also include the function point count and estimated LOE for a project in a planning stage. In an embodiment, the database 14 may be distributed across multiple storage devices and across multiple independent database systems.

The inter-application document 22, the intra-application documents 24, and the existing interactions document 26 may be manually edited specifically to support the system 10 or may be provided as one or more documents developed as part of a software development process, for example during an analysis modeling phase of the software development process. It may happen that different personnel may perform analysis modeling at different levels of detail. To promote consistency of the analysis model, which may tend to promote consistent function point counting and LOE estimating by the function point counting tool 12, it may be desirable to rigorously define in a process document or procedures manual the content and appropriate level of detail to be provided in the inter-application document 22 and the intra-application documents 24. An industry standard architectural model or process model, such as the enhanced telecom operations map (eTOM) in the telecommunications industry, may be employed to identify and articulate appropriate levels of detail. The project data 28 may be manually edited specifically to support the system 10 or may be provided as one or more documents developed as part of a project management effort.

The function point counter 16 is operable to access the database 14 and to read a plurality of interaction information from the inter-application document 22 and the intra-application documents 24 and to analyze the interaction information to count interactions identified in the interaction information as possible function points. The function point counter 16 is also operable to read the existing interactions document 26 and to compare interactions found in the existing interactions document 26 with interactions found in the inter-application document 22 and the intra-application documents 24. If an interaction counted as a possible function point is found in the existing interactions document 26, the possible function point is not counted as a new function point, because the subject interaction has already been developed and may be reused by the developers.

The function point counter 16 counts an individual function point only once. For example, a function point that may be new to the project may be employed multiple times in the project. This function point is only counted once in the count of function points. While in the preferred embodiment the function point count accorded an inter-application interaction or communication is weighted equal to an intra-application interaction or communication, in other embodiments inter-application interaction or communications may be weighted differently relative to an intra-application interaction or communication. The function point counter 16 may store the function point count in the project data 28 associated with the project, for example project data 28a.

The LOE estimator 18 generates an LOE for a project based on the function point count produced by the function point counter 16. The LOE estimator 18 may invoke the function point counter 16 to generate the function point count or may look up the function point count stored by the function point counter 16 in the project data 28, for example project data 28a. In one embodiment, the LOE is calculated solely on the basis of the function point count. The LOE may be calculated as a linear function of the function point count, as for example LOE=k*(count of FPs), where k is a proportionality constant. For example, one possible mapping of function point to LOE may be LOE=(50 hours per FP)*(count of FPs). The LOE imputed to each function point may include all implementation activities, for example building software loads, testing software loads, documenting the implementation, and other activities. Alternately, LOE may be calculated using a look-up table where the proportionality constant k is looked up in a table based on the function point count.

In another embodiment, the LOE is calculated based on the function point count and project data 28 associated with completed projects stored in the database 14. The project data 28 may be averaged across all completed projects to produce a simple average LOE per function point number. Alternately, projects may be categorized, and the completed project data 28 may be selected to employ only data from completed projects that are similar to the project being estimated. The function point counting tool 12 may permit an operator to select specific completed projects from the project data 28 to use in calculating the LOE. The process of using data from the project data 28 to adjust the calculation of LOE may be termed calibrating the LOE calculation. In an embodiment, the LOE calculation may be adjusted based on the type of software being developed, for example embedded type software, mission critical type software, non-mission critical type software, information technology type software, banking transaction type software, and other definable types of software. Adjusting the calculation of LOE based on the type of software may also be termed calibrating the LOE calculation.

In an embodiment, the LOE calculator 18 may calculate LOE based partly on the function point types. For example, the LOE may be calculated as:

$$LOE=(\text{count of } FP \text{ type1})*k_1+(\text{count of } FP \text{ type2})*k_2+(\text{count of } FP \text{ type3})*k_3+(\text{count of } FP \text{ type4})*k_4+(\text{count of } FP \text{ type5})*k_5$$

where the types are those defined in the standard function counting documentation mentioned above and where $k_x$ is a proportionality constant applicable to its associated function point type. In some embodiments, either more or fewer types of function points may be supported. Those skilled in the art will appreciate that the several alternative methods of calculating LOE described above may readily be extended to apply to the case of multiple function point types.

The productivity calculator 20 calculates a productivity metric for a completed project that relates the actual LOE expended to complete the project to the function points delivered by the project. When a project has been completed, both the count of function points implemented by the project and the actual LOE expended to complete the project may be saved in an appropriate project data 28, for example the project data 28a. The productivity calculator 20 is operable to access the database 14 and to read the project data 28, for example the project data 28a. The count of function points implemented by the project and the actual LOE expended on the project are read from the project data 28, and the productivity metric is calculated. In one embodiment a productivity index (PI) is calculated as:

$$PI=LOE/(\text{count of } FPs).$$

Productivity is improved as the value of PI decreases.

Related productivity metrics may also be calculated by the productivity calculator 20. For example, a productivity change rate in percent may be calculated to indicate whether productivity is increasing or decreasing and to what degree. In one embodiment, the productivity rate of change is calculated as:

$$\text{Productivity rate of change}=[(PI(n)/PI(n-1))-1]*100$$

where PI(n) is the productivity of the n-th completed project and PI(n−1) is the productivity of the project completed just before the n-th completed project. Other productivity metrics readily suggest themselves to those skilled in the art, and all such productivity metrics based on function points are contemplated by the present disclosure.

The function point counting tool 12 automates the process of sizing a project, such as estimating the LOE for implementing a project. This is less expensive and time consuming than manual LOE estimation techniques. The function point counting tool 12 provides repeatable, objective results. Where a development organization currently prepares detailed analysis models as a part of the development process, the data that the function point counting tool 12 analyzes to generate the function point count and the LOE estimate are already available. Additionally, the analysis model is timely available to provide the function point count and the LOE estimate when it is needed to provide input to an outsourcing contract negotiation.

The function point counting tool 12 may be employed in a variety of manners at various times during the development process, as will readily suggest themselves to one skilled in the art. The function point count may be generated and the productivity index PI may be calculated at various points, such as part way through a project or development effort, to evaluate whether the project or development effort is making good progress or to determine whether a problem exists and corrective action should be taken. Other metrics useful for analyzing the status of the project, for example for management purposes, include the total to date LOE compared with the total calculated LOE for the project, and/or the total to date function points as compared with the total calculated function points for the project. It may be useful to compare ratios or percentages of time spent or remaining time for the project with function point or LOE completed and remaining for the project. Various progress metrics based on the count of function points completed versus the count of function points total may be calculated.

Also, in some embodiments, the function point count may be used directly to set an outsourcing price. For example, each function point may be associated with a development cost and the net count may be multiplied times the cost per function point to obtain the outsourcing price for the development. It will be appreciated that numerous other factors associated with application development and well known to those skilled in the art may be included in this calculation as well. The productivity rate of change metric described above may be used to mandate productivity improvements to an outsourcing firm or to design incentive packages for outsourcing firms. All of these uses for the function point counting tool 12 are contemplated by the present disclosure.

Figure 2:
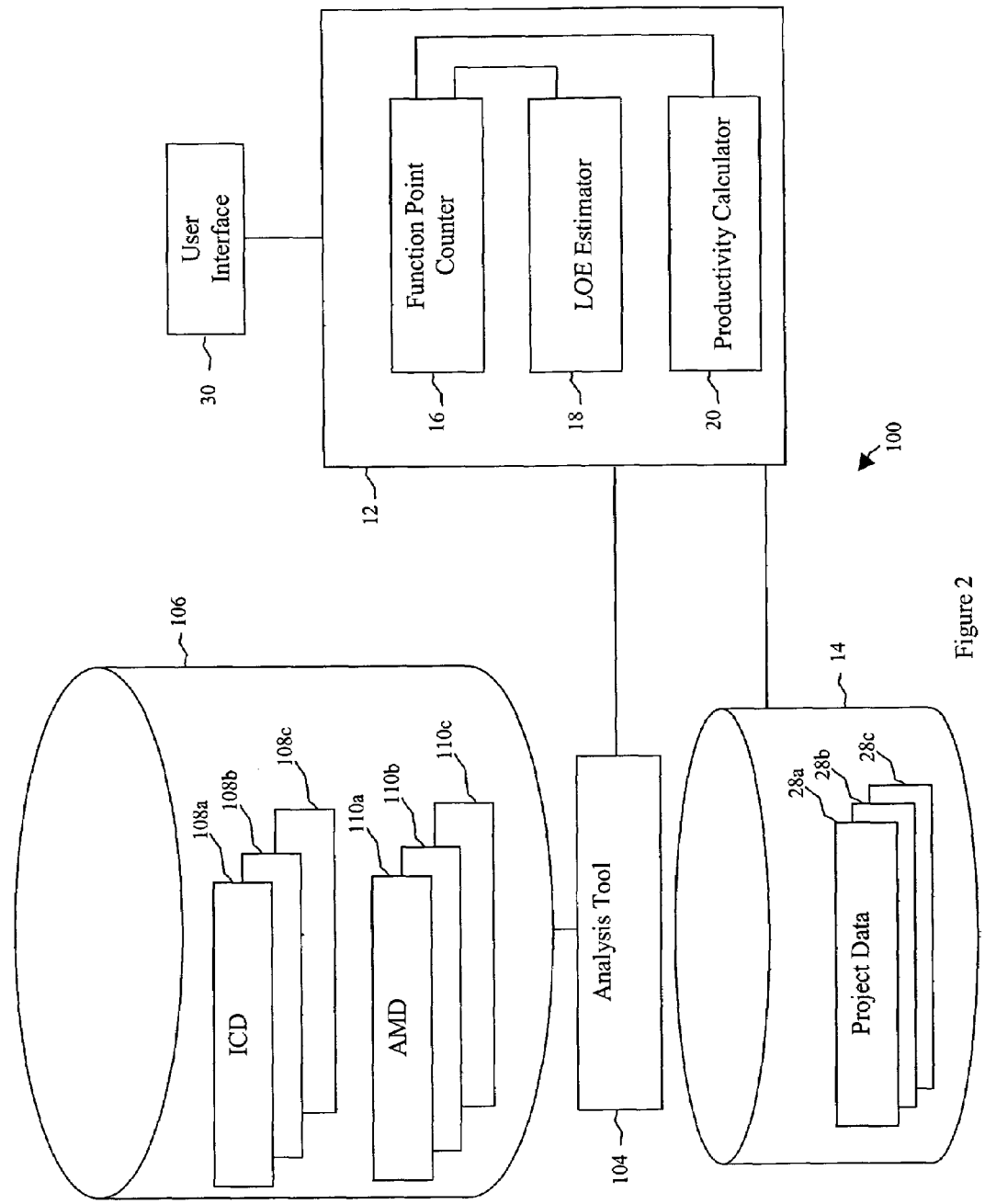
FIG. 2 is a block diagram of the function point counting system according to another embodiment.

Turning now to FIG. 2, a block diagram of a system 100 according to another embodiment is depicted. The function point counting tool 12 is in communication with a computer aided software engineering (CASE) tool 104 used to perform analysis model activities. The CASE tool 104 is in communication with an analysis model database 106. The analysis model database 106 contains a plurality of interface control documents (ICDs) 108 and a plurality of application model documents (AMDs) 110. The ICDs 108 identify inter-application interactions, for example in the form of sequence diagrams. The AMDs 110 identify intra-application interactions, for example in the form of sequence diagrams.

Both the ICDs 108 and the AMDs 110 may contain additional information irrelevant to the system 100. The ICDs 108 and the AMDs 110 may be associated with completed projects, projects in the implementation phase, and projects in the analysis phase. The ICDs 108 and AMDs 110 taken together represent the analysis model of the project.

The CASE tool 104 is employed to create and to maintain the ICDs 108 and the AMDs 110. In an embodiment, the CASE tool 104 aligns with or supports a unified modeling language (UML) based analysis methodology. Linking the function point counting tool 12 with the CASE tool 104 may leverage the benefits of the CASE tool 104 and may also further enforce the analysis model approach to software development.

The function point counter 16 may access the ICDs 108 and the AMDs 110 by accessing the analysis model database 106 directly or indirectly via the CASE tool 104. The functionality and communications of the LOE estimator 18 and the productivity calculator 20 are substantially similar to the system 10 described above. In an embodiment, an interface for accessing and controlling the function point counting tool 12 may be added into the interface of the CASE tool 104. In an embodiment, the CASE tool 104 is an IBM RationalRose CASE tool.

The CASE tool 104 may be used to identify current or new projects and, using the ICDs 108 and/or AMDs 110, determine the functionality required to enable a new application, for example. This functionality may be associated with the function points, which may be identified using the function point counter 16. Also, whether any of the function points have been previously developed may be determined by the function point counting tool 12 by referencing, for example, the prior project data 28 and/or existing interactions 26. By calculating the function points for the new project or application, and subtracting those already developed, an accurate estimate of the time and/or cost may be developed. The function points may be counted independent of the coding implementation language, for example Java, C, COBOL, or other languages. Also, adjustment factors to account for complexity based on platform dependence and automating the counting of the adjustment factor may be made as well.

As with the system 10 of FIG. 1, a user interface 30 can be present in the system 100 by means of which an analyst can enter information about the relationships in a data class. As described above, this information can be used to assign a function point count for all transactions involving a group of related data in the data class.

Figure 3:
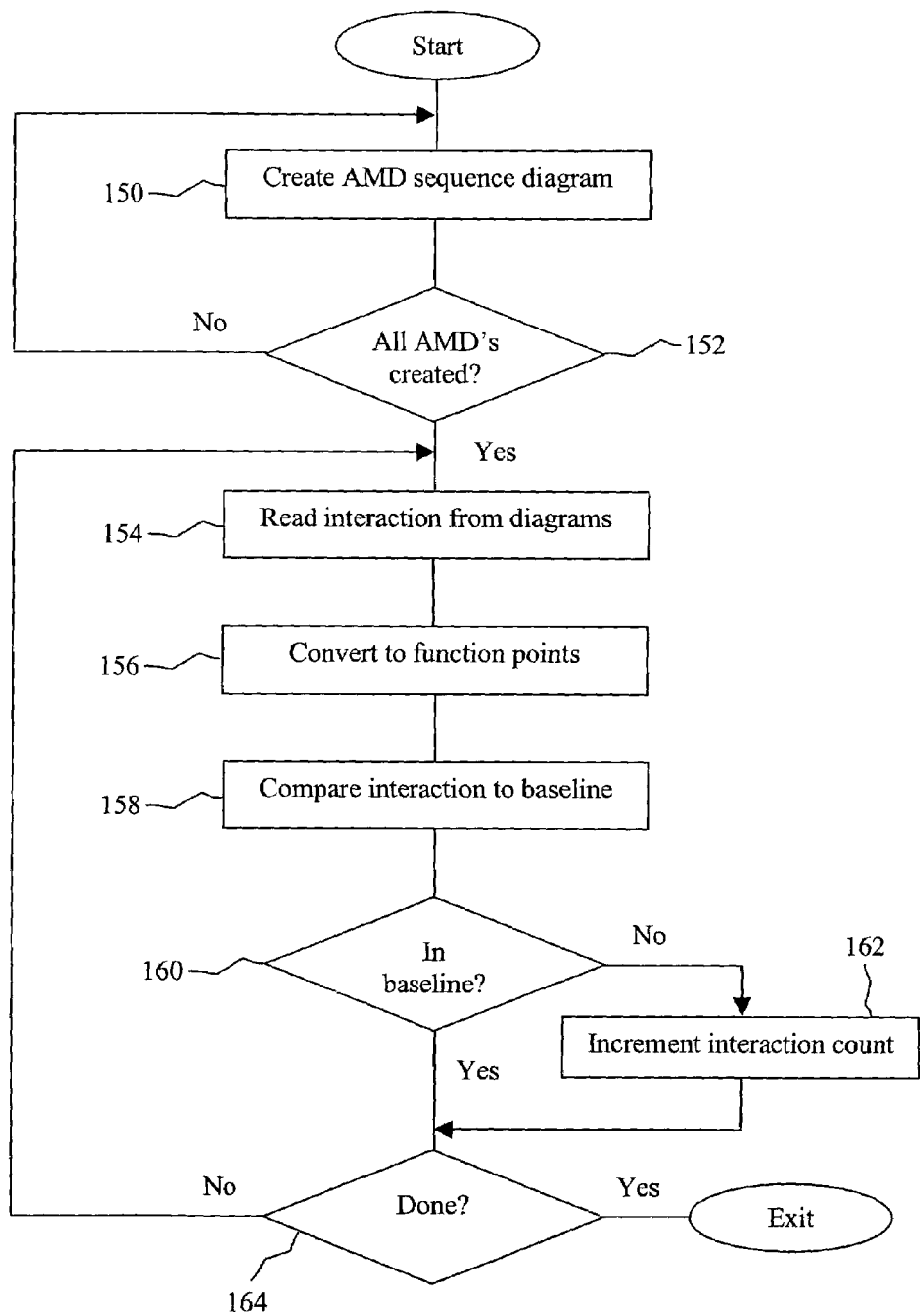
FIG. 3 is a flow chart illustrating a method of counting function points to size a development project.

Turning now to FIG. 3, a method for counting the new function points to be developed to complete a project is depicted. At block 150, a sequence diagram of one AMD 110 is created, for example a first AMD 110a. The sequence diagram of the first AMD 110a may be created using the CASE tool 104. The sequence diagram of the first AMD 110a identifies interactions between components involved in the project. In some embodiments, the interactions between components may be identified in a different document such as an ICD.

The method proceeds to block 152 where, if there are more AMDs 110 to be created, for example a second AMD 110b and a third AMD 110c, the method returns to block 150. By looping repeatedly through blocks 150 and 152, a plurality of AMDs 110 may be created. When all AMDs 110 have been created, the method proceeds to block 154 where an interaction is read from the sequence diagrams of the AMD 110. The method proceeds to block 156 where one or more pairs of start and end points in the sequence diagrams of the AMD 110 are converted to a function point. As described above, the number of function points assigned to a transaction with a data class can be set automatically or can be determined by a human analyst based on the complexity of the data class. A complexity rating might be automatically assigned to a function point at this point.

The method proceeds to block 158 where the interaction read in block 154 is compared to all interactions that are deemed part of a baseline. The baseline may be represented by the existing interactions document 26 or may be extracted from the AMDs 110, which are located in the analysis database 106, and known to be associated with completed projects.

The method proceeds to block 160 where, if the interaction is determined to not be in the baseline, the method proceeds to block 162 where the function point count is incremented. The process proceeds to block 164 where, if all interactions have not been read, the process returns to block 154. In block 160, if the interaction is determined to be in the baseline, the method proceeds to block 164 and the function point count is not incremented.

By looping repeatedly through blocks 154, 156, 158, 160, and 162 all function points are counted that do not represent function points already in the baseline. In block 164, when all interactions have been analyzed, the method exits and the function point count is final. A human analyst might make adjustments to the complexity ratings at this point.

Figure 4:
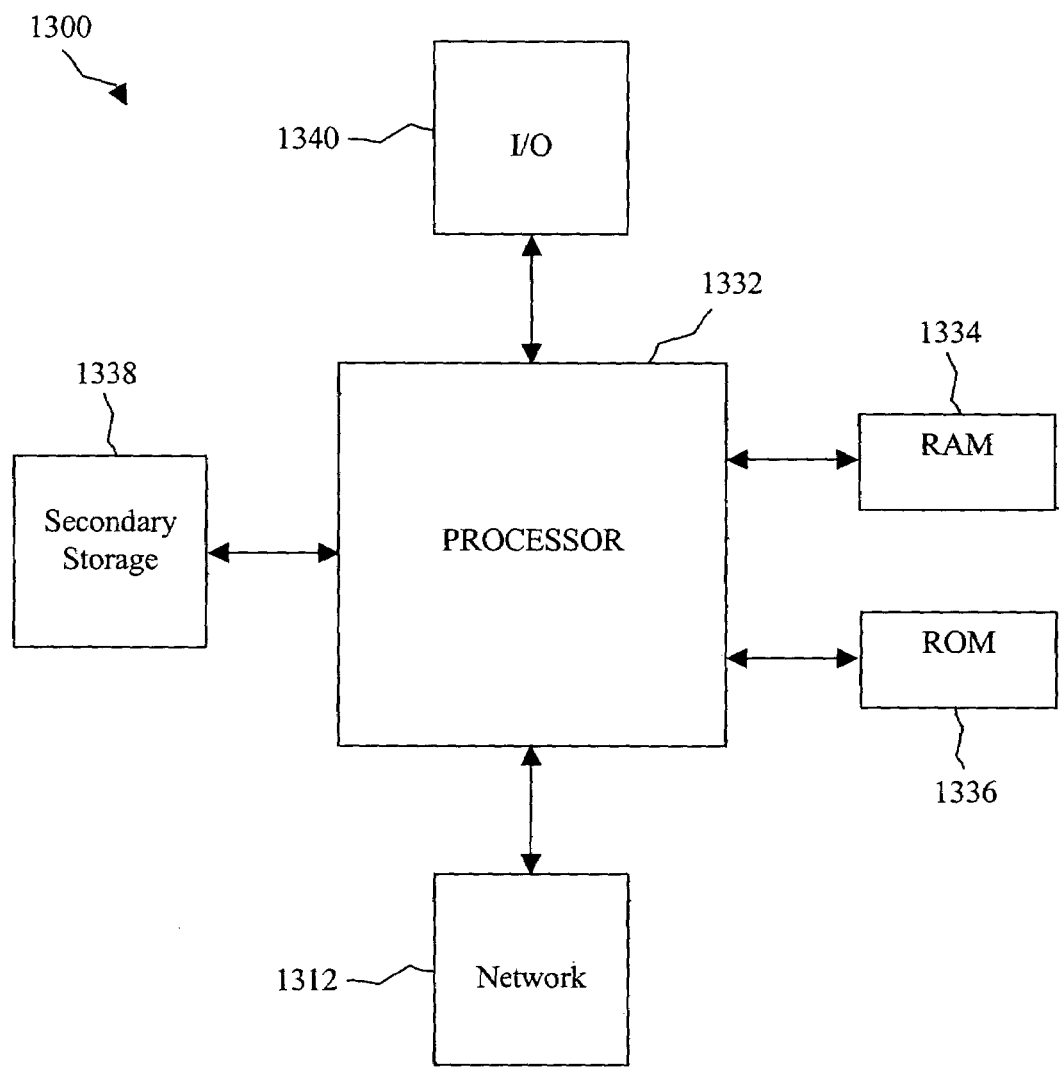
FIG. 4 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 4 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs that are loaded into RAM 1334 when such programs are selected for execution. The ROM 1336 is used to store instructions and perhaps data that are read during program execution. ROM 1336 is a non-volatile memory device that typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with the Internet or one or more intranets. With such a network connection, it is contemplated that the processor 1332 might receive information from a network or might output information to a network in the course of performing the above-described method steps.

Such information, which may include data or instructions to be executed using processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1332 executes instructions, codes, computer programs, or scripts that it accesses from hard disk, floppy disk, optical disk (these various disk-based systems may all be considered secondary storage 1338), ROM 1336, RAM 1334, or the network connectivity devices 1312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer-implemented system for automatically counting function points, comprising:
    an electronic document containing a sequence diagram that specifies transactions in a software application;
    at least one component stored in a memory and executable by a processor to analyze the transactions in the sequence diagram to identify a start point and an end point in the sequence diagram as a function point, the at least one component further maintains a count of function points; and
    a user interface stored in a memory and executable by a processor to enable a set of data objects to be identified and a number of function points to be assigned to the set of data objects prior to the at least one component counting the function points in the sequence diagram, wherein when the sequence diagram comprises one or more transactions involving one or more data objects of the set of data objects identified via the user interface, the at least one component counts the one or more transactions as the number of function points assigned regardless of how many of the one or more transactions are in the sequence diagram.

2. The system of claim 1, wherein information about the set of data objects is elicited through a questionnaire displayed on the user interface.

3. The system of claim 1, wherein the start point is selected from a group of start points consisting of:
    user interfaces;
    actors; and
    system components.

4. The system of claim 3, wherein the end point is selected from a group of end points consisting of:
    user interfaces;

actors;

system components; and application data stores.

5. The system of claim 1, wherein when a plurality of sequence diagrams comprise one or more transactions involving one or more data objects of the set of data objects identified by the user interface, the at least one component counts the one or more transactions as the number of function points assigned regardless of how many of the one or more transactions are in the plurality sequence diagrams.

6. The system of claim 1, wherein the count of function points is decreased by a count of equivalent previously existing function points.

7. The system of claim 6, wherein the count of function points is used to estimate a level of effort to be expended to develop the software application.

8. The system of claim 7, wherein the estimated level of effort and an actual level of effort expended to develop the software application are used to calculate a productivity metric for the development of the software application.

9. The system of claim 1, wherein a user interface start point and a system component end point define an external input function point.

10. The system of claim 1, wherein a user interface start point and an application data store end point define an external input function point.

11. The system of claim 1, wherein an actor start point and an application data store end point define an external input function point.

12. The system of claim 1, wherein a system component start point and one of an actor end point, a user interface end point, and an application data store end point define an external output function point.

13. The system of claim 1, wherein a system component start point and one of an actor end point, a user interface end point, and an application data store end point define an external query function point.

14. A computer-implemented system for automatically estimating a level of effort to be expended to develop a software application based on an automatically generated function point count, comprising:

a first electronic document containing a first sequence diagram that specifies transactions for the software application to be developed;

a second electronic document containing a second sequence diagram that specifies transactions for the software application to be developed;

a function point counter stored in a memory and executable by a processor to analyze the transactions in the first sequence diagram in the first electronic document and in the second sequence diagram in the second electronic document to identify a start point and an end point in the first sequence diagram and a start point and an end point in the second sequence diagram as function points, the function point counter further maintains a count of the function points;

a user interface stored in a memory and executable by a processor to enable a set of data objects to be identified and a single function point to be assigned to the set of data objects prior to the function point counter counting the function points in the first and second sequence diagrams, wherein when the first and second sequence diagrams comprise one or more transactions involving one or more data objects of the set of data objects identified via the user interface, the function point counter counts the one or more transactions as the single function point assigned regardless of how many of the one or more transactions are in the first and second sequence diagrams;

a tool stored in a memory and executable by a processor to compute a net function points for the software application to be developed by subtracting from the count of the function points a count of previously developed function points having interactions similar to interactions of the function points from the first and second electronic documents; and an estimator component stored in a memory and executable by a processor to use the count of net function points to create an estimate of the level of effort to be expended to develop the software application.

15. The system of claim 14, wherein the estimator component further determines a total cost for development of the software application based on the count of net function points.

16. The system of claim 14, further comprising a component that monitors productivity using at least one of the count of the function points from the first and the second documents and the net function points.

17. The system of claim 14, wherein at least one pair of start points and end points in at least one of the first sequence diagram and the second sequence diagram defines a function point.

18. The system of claim 17, wherein the function points are selected from a group of function points consisting of:

external inputs;

external outputs;

external queries;

internal logical files; and external interface files.

19. A computer-implemented method for managing a software development project, comprising:

identifying a set of data objects via a user interface;

assigning a single function point to the set of data objects via the user interface;

analyzing, by a function point counter stored in a memory and executed by a processor, transactions in a sequence diagram contained in an electronic document to identify a start point and an end point in the sequence diagram as a function point;

maintaining, by the function point counter, a count of function points after the set of data objects have been identified and the single function point assigned to the set of data objects via the user interface, wherein when one or more transactions in the sequence diagram involve one or more data objects of the set of data objects identified via the user interface, the one or more transactions are counted as the single function point assigned regardless of how many of the one or more transactions are in the sequence diagram;

creating, by the function point counter, a net function points count by subtracting from the count of function points a number of previously developed function points; and calculating, by a level of effort estimator stored in a memory and executed by a processor, a level of effort based on the count of net function points.

20. The method of claim 19, wherein the calculated level of effort and an actual level of effort expended to develop a software application are used to calculate a productivity metric for the development of the software application.

* * * * *